(12) United States Patent
Bucci et al.

(10) Patent No.: US 9,975,038 B2
(45) Date of Patent: May 22, 2018

(54) TACTILE, INTERACTIVE NEUROMORPHIC ROBOTS

(71) Applicant: The Regents of the University of California, Oakland, CA (US)

(72) Inventors: Liam David Bucci, Irvine, CA (US); Ting-Shuo Chou, Irvine, CA (US); Jeffrey Lawrence Krichmar, Cardiff By The Sea, CA (US)

(73) Assignee: The Regents of the University of California, Oakland, CA (US)

( * ) Notice: Subject to any disclaimer, the term of this patent is extended or adjusted under 35 U.S.C. 154(b) by 316 days.

(21) Appl. No.: 14/532,353

(22) Filed: Nov. 4, 2014

(65) Prior Publication Data
US 2015/0151196 A1    Jun. 4, 2015

Related U.S. Application Data

(60) Provisional application No. 61/899,793, filed on Nov. 4, 2013.

(51) Int. Cl.
| | |
|---|---|
| *A63F 9/24* | (2006.01) |
| *A63F 9/06* | (2006.01) |
| *A63H 33/00* | (2006.01) |
| *G06N 3/00* | (2006.01) |
| *G06N 3/04* | (2006.01) |
| *B25J 9/16* | (2006.01) |

(52) U.S. Cl.
CPC .............. *A63F 9/24* (2013.01); *A63F 9/0604* (2013.01); *A63H 33/005* (2013.01); *G06N 3/008* (2013.01); *G06N 3/049* (2013.01); *A63F 2009/2408* (2013.01); *A63F 2009/2447* (2013.01); *A63H 2200/00* (2013.01); *G05B 2219/40625* (2013.01); *G05B 2219/40627* (2013.01); *Y10S 901/01* (2013.01); *Y10S 901/46* (2013.01); *Y10S 901/47* (2013.01)

(58) Field of Classification Search
CPC ................ A63F 9/24; A63F 2009/2408; A63F 2009/2447; B25J 9/16; G06N 3/08; Y10S 901/46; G05B 2219/40625
See application file for complete search history.

(56) References Cited

U.S. PATENT DOCUMENTS

| | | | | |
|---|---|---|---|---|
| 8,793,205 | B1 * | 7/2014 | Fisher | G06N 3/008 706/25 |
| 2005/0216126 | A1 * | 9/2005 | Koselka | B25J 5/007 700/259 |
| 2010/0117993 | A1 * | 5/2010 | Kent | G06F 3/0436 345/177 |

(Continued)

OTHER PUBLICATIONS

Abraira, et al., "The sensory Neurons of Touch", Neuron, vol. 79, 2013.

(Continued)

*Primary Examiner* — Tramar Harper
*Assistant Examiner* — Malina D Blaise
(74) *Attorney, Agent, or Firm* — Thomas | Horstemeyer, LLP (57) ABSTRACT

In one embodiment, a neuromorphic robot includes a curved outer housing, and multiple touch sensors provided on the outer housing, wherein the robot is configured to interpret a touch of a user sensed with the touch sensors.

20 Claims, 10 Drawing Sheets

(56) References Cited

U.S. PATENT DOCUMENTS

| | | | | |
|---|---|---|---|---|
| 2012/0116584 | A1* | 5/2012 | Kim | B25J 9/1656 700/246 |
| 2013/0078600 | A1* | 3/2013 | Fischer | G09B 19/00 434/236 |
| 2013/0094126 | A1* | 4/2013 | Rappoport | G02B 27/01 361/679.01 |
| 2014/0016910 | A1* | 1/2014 | Yu | H04N 9/87 386/234 |
| 2014/0049505 | A1* | 2/2014 | Radivojevic | G06F 3/04883 345/174 |
| 2014/0367911 | A1* | 12/2014 | Huang | A63H 33/22 273/161 |

OTHER PUBLICATIONS

Johansson, et al., "Coding and use of tactile signals from the fingertips in object manipulation tasks", Nat. Rev. Neurosci, vol. 10, May 2009.

Evans, et al., "The effect of whisker movement on radial distance estimation: A case study in comparative robotics", Front Neurogobut, vol. 6, 2012.

Pearson, et al., "Biomimetic vibrissal sensing for robots", Philos Trans R. Soc Land B. Biol Sci, vol. 366, Nov. 2011.

Schroeder, et al., "Sensory prediction on a whiskered robot: a tactile analogy to optical flow", Front Neurorobat, vol. 6, 2012.0.

Bologna, et al., "Encoding/decoding of first and second order tactile afferents in a neurorobotic application", J. Physiol Paris, vol. 105, Jan.-Jun. 2011.

Bolonga, et al., "A closed-loop neurobotic system for fine touch sensing", J. Neural Eng. vol. 10, Aug. 2013.

Oddo, et al., "Soft-neuromorphic artificial touch for applications in neuro-robotics", Biomedical Robotics and Biomechatronics, 2012 4th IEEE RAS and EMBS Int Conference, 2012.

Cannato, et al., "An embedded artificial skin for humanoid robots", Multisensor Fusion and Integration for Intelligent Systems, 2008.

Dahiya, et al., "Tactile sensing from humans to humanoids", IEEE transactions on robotics, vol. 26, 2010.

Maheshwari, et al., "Tactile devices to sense touch on a par with a human finger", Angew chem Int Ed Engl, vol. 47, 2008.

Johansson, et al., "Firstr spikes in ensembles of human tactile afferents code complex spatial fingertip events", Nat. Neurosci, vol. 7, 2004.

Shadlen, et al., "The variable discharge of cortical neurons: implications for connectivity, computation, and information coding", J. Neurosci, vol. 18, May 1998.

Izhikevich, E. M., "Polychronization: computation with spikes" Neural Comput, vol. 18, Feb. 2006.

Brette, R., "Computing with neural synchrony", PLos Comput Viol, vol. 8, 2012.

Swadlow, H.A., "Efferent neurons and suspected interneurons in second somatosensory cortex of the awake rabbit: receptive fields and axonal properties", J. Neurophysiol, vol. 66, Oct. 1991.

Bi, et al., "Synaptic modification by correlated activity: Hebb's postulate revisted", Annu Rev Neurosci, vol. 24, 2001.

Song, et al., "Competitive Hebbian learning through spike-timing-dependent synaptic plasticity", Nature Neuroscience, vol. 3, Sep. 2000.

Izhikevich, E. M., "Which model to use for cortical spiking neurons?", IEEE trans neural netw, vol. 15, Sep. 2004.

Carlson, et al., "Biologically Plausible Models of homestatsis and STDP: Stability and learning in spiking neural networks", International joint conference on neural networks, 2013.

Roger, et al., "Social commitment robots and dementia", Can J. Aging, vol. 31, Mar. 2012.

Shibata, et al., "Robot therapy: a new approach for mental healthcare of the elderly—a mini review", Gerontology, vol. 57, 2011.

Barakova, et al., "Brain-inspired robots for autistic training and care", Neuromorphic and Brain-Based Robots, 2011.

Bekele, et al., "A step towards developing adaptive robot-mediated intervention architecture (ARIA) for children with autism", IEEE Trans Neural Sys Rehabil Eng, vol. 21, Mar. 2013.

Billard, et al., "Building robota, a mini-humanoid robot for the rehabilitation of children with autism", Assist Technol. vol. 19, 2007.

* cited by examiner

TACTILE, INTERACTIVE NEUROMORPHIC ROBOTS

CROSS-REFERENCE TO RELATED APPLICATION(S)

This application claims priority to U.S. Provisional Application Ser. No. 61/899,793, filed Nov. 4, 2013, which is hereby incorporated by reference herein in its entirety.

NOTICE OF GOVERNMENT-SPONSORED RESEARCH

This invention was made with Government support under grant/contract number 0910710, awarded by the National Science Foundation. The Government has certain rights in the invention.

BACKGROUND

The ability to engage the world through tactile sensing is prevalent in all organisms. In humans, touch is used to manipulate and categorize objects, react to stimuli, and to perceive and control the body. Creating an artificial system with this range of capabilities is a daunting task but an important one if robots are to operate in similar environments as humans. Therefore, tactile sensing is an active area of robotics research.

Creating an artificial tactile system is difficult for many reasons. For example, the sensors must cover a large range and be compliant with the surfaces with which they interact. Moreover, the spatiotemporal nature of tactile stimuli, as well as the noisy sensors and environments in which they operate, make the perception of touch a complex problem. To encode tactile signals in the nervous system, there is evidence for both a rate code and a temporal code. A rate code, in which information is carried by rate of neuronal activity, is simpler and less susceptible to noise. A temporal code, however, where information is carried by the temporal order and time intervals of neural activity, has a larger capacity for encoding patterns.

BRIEF DESCRIPTION OF THE DRAWINGS

The present disclosure may be better understood with reference to the following figures. Matching reference numerals designate corresponding parts throughout the figures, which are not necessarily drawn to scale.

FIGS. 7A and 7B are graphs that show the response of neurons of a prototype neuromorphic robot. FIG. 7A shows the response to a left movement and FIG. 7B shows the response to no movement. In the graphs, each dot represents a spike from a neuron.

FIGS. 8A and 8B are graphs that show the correlation of firing activity between movements in an SNN.

FIGS. 9A and 9B are graphs that plot receiver operator characteristic (ROC) curves. FIG. 9A shows the ROC curves for firing rate decoding and FIG. 9B shows the ROC curves for polychronous group decoding.

DETAILED DESCRIPTION

As described above, it would be desirable to have an artificial tactile system with which humans can interact. Disclosed herein are neuromorphic robots that are designed for this purpose. In some embodiments, the robot is autonomous and its behavior is guided by a simulated nervous system that enables it to interact with human beings. In some embodiments, the robot comprises a convex outer surface on which is provided multiple sensors that can be used to detect the touch of a user. When a touch is detected, the nature of the touch can be evaluated, an appropriate response can be determined using the simulated nervous system, and the robot can automatically react in an appropriate way. In some embodiments, the robot can communicate to the user that the touch is either good or bad through one or more of audio feedback, visual feedback, tactile or vibratory feedback, and robot movement.

In the following disclosure, various specific embodiments are described. It is to be understood that those embodiments are example implementations of the disclosed inventions and that alternative embodiments are possible. All such embodiments are intended to fall within the scope of this disclosure.

Described below are neuromorphic robots that facilitate interaction and communication with human beings. The robots are highly interactive and, in some embodiments, respond to touch, sound, and vision. For reasons that will become apparent from the disclosure that follows, the robots have therapeutic applications for various disorders, such as Alzheimer's, autism spectrum disorders (ASD), dementia, depression, and attention deficit hyperactivity disorder (ADHD). In addition, the robots have applications in entertainment contexts as a toy and domestic contexts as a companion.

In some embodiments, the robots' behavior is controlled by a spiking neural network (SNN), which is based on neuronal activity in the brain. The SNN can learn to recognize different forms of touch provided by a user. In particular, the spatial and temporal nature of the interaction is closely coupled with the response of the SNN and its ability to learn spatiotemporal patterns. Inputs of the user, such as sweeps of a hand across the robot similar to petting of an animal, can be coded into neural spikes that retain temporal information and allow decoding for the direction and velocity of the movement. The robot can then respond to these movements with audio responses and/or by displaying colors and patterns. These responses can communicate behaviors, desires, or other useful information to a user. In some embodiments, the robots can be specifically designed to take advantage of the temporal nature of neuronal activity and synaptic plasticity. The use of an SNN provides the robots with the ability to learn temporal patterns and therefore discriminate user inputs.

The robots can take advantage of two-way learning or behavior shaping where the robot learns from the user and the user learns from the robot. In some embodiments, different hand sweeps can be coupled to reward and punishment. For example, the robot might signal a soothing color on its skin and emit a pleasant sound when it is rubbed from front to back, but will signal a harsh color and noxious sound when petted back to front. In another interaction scenario, the robot could learn to recognize and tailor its response to a particular user. For example, a child might pet the robot in a particular way that it interprets as pleasing. In this case, the robot could orient towards the child, "look" at the child with a camera, and remember the child's face and interaction. If the child interacts with the robot in a way that is interpreted as non-pleasing, the robot can move away from this child when it is touched or recognizes the child. In another scenario, the robot can indicate its desire to play with a child through color signaling and movement (e.g., move towards or away the child). If the robot wants to play and the child approaches, the robot can signal its pleasure by displaying a soothing color and sound. If the robot does not want to play, it can signal a different color and sound. In these ways, there is an interaction in which the robot shapes the child's behavior and the child shapes the robot's behavior resulting in an enhanced interaction experience. In this way, the robot can teach appropriate social behavior with another, which could transfer to interpersonal relationships.

Figure 1:
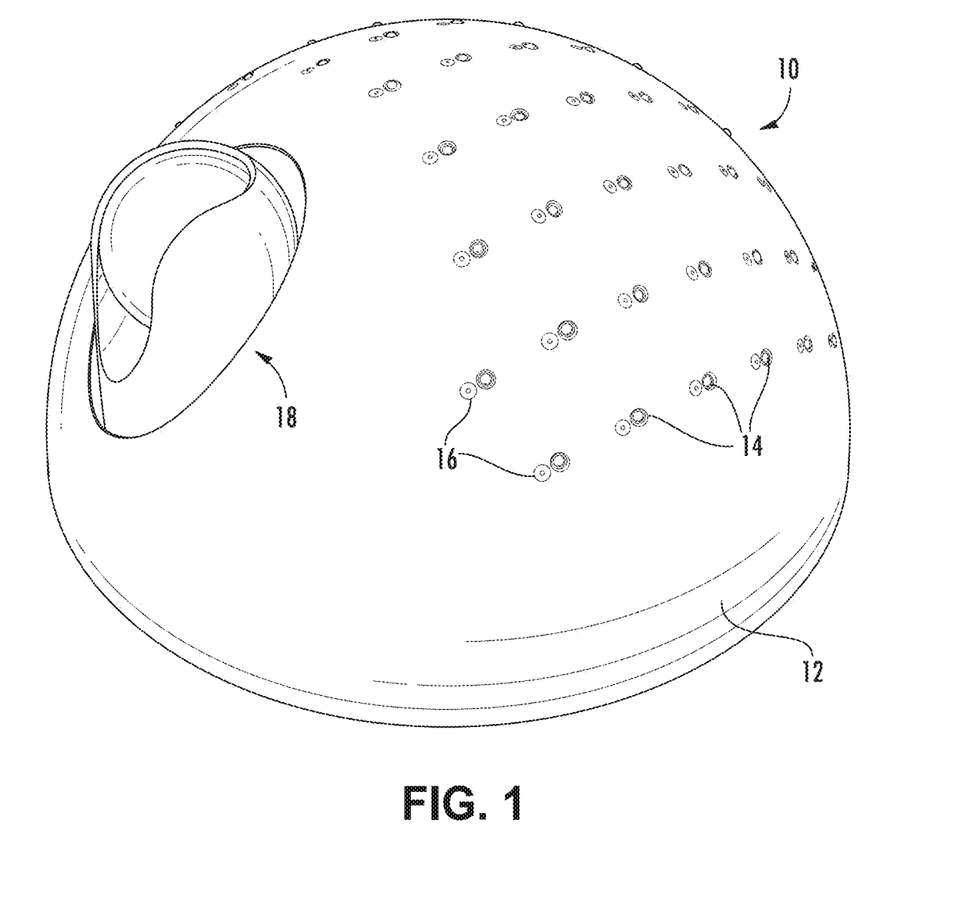
FIG. 1 is a perspective view of an embodiment of a tactile, interactive neuromorphic robot.
Figure 2:
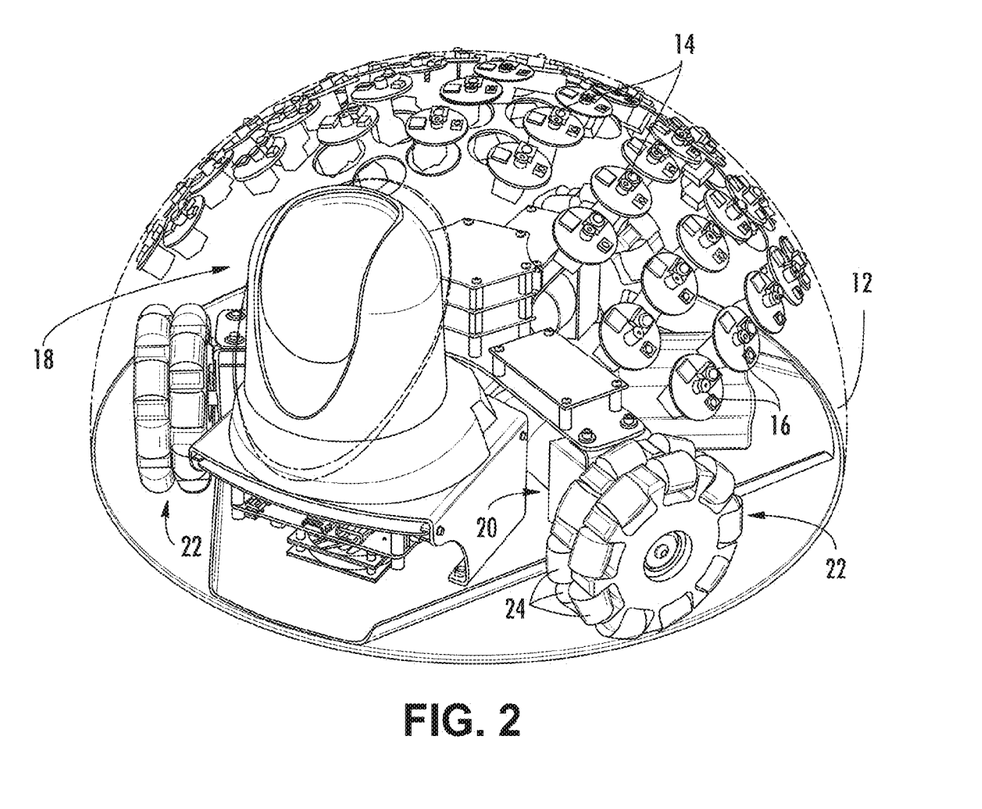
FIG. 2 is a perspective view of the tactile, interactive neuromorphic robot of FIG. 1 that reveals internal components of the robot.

FIGS. 1 and 2 illustrate an embodiment of an autonomous, tactile, interactive neuromorphic robot 10 that can provide the types of functionality described above. More particularly, FIG. 1 shows the exterior of the robot 10 while FIG. 2 reveals internal components of the robot. As can be appreciated from these figures, the robot 10 generally comprises a convex hemispherical outer housing 12 upon which are provided multiple touch sensors 14. By way of example, the housing 12 can have a radius of approximately 40 to 42 cm and can support approximately 60 to 70 touch sensors 14, which are each spaced from its neighboring sensors by a distance of approximately 2.5 to 3 cm. Associated with each touch sensor 14 is a light 16 that, for example, can be illuminated when its associated sensor detects the touch of a user. In some embodiments, the touch sensors 14 comprise trackball sensors and the lights 16 comprise one or more light emitting diodes (LEDs). When the touch sensors 14 detect touch, such as when the user sweeps a hand across the surface of the housing 12, the sensed touch can be coded into neural spikes that retain temporal information and enable decoding for the direction and velocity of the movement. The LEDs can be used to display colors and patterns that can communicate behaviors, desires, or other useful information to the user.

As is further depicted in FIGS. 1 and 2, the neuromorphic robot 10 can also include a pan-tilt-zoom camera 18 (e.g., a Toshiba WB16A IP). In addition, as shown in FIG. 2, the robot 10 can include a drive system 20 that can be used to move the robot in any desired direction, for example, in response to a user's touch. In some embodiments, the drive system 20 is a holonomic drive system having three triangularly oriented omni-wheels 22. Each of these wheels 22 includes rollers 24 that can be rotated to drive the robot 10 in a direction that is perpendicular to the drive direction of the wheel. With such wheels 22, the robot 10 can be easily moved within confined spaces.

Figure 3:
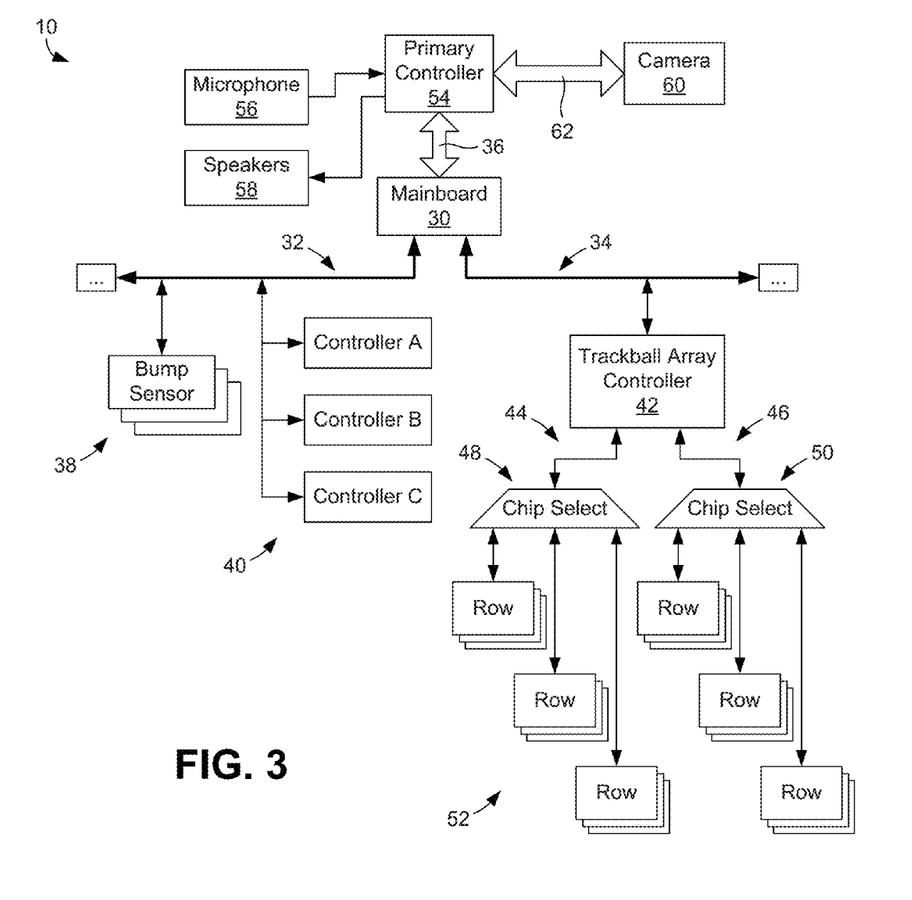
FIG. 3 is a block diagram of an embodiment of an architecture for the tactile, interactive neuromorphic robot of FIGS. 1 and 2.

FIG. 3 is a block diagram that illustrates an example architecture for the neuromorphic robot 10 of FIGS. 1 and 2 and identifies further components that the robot can include. Although many components are identified in FIG. 3, it is noted that the robot 10 can include further components that are not explicitly identified in the figure.

In the example embodiment of FIG. 3, the robot 10 includes a mainboard 30 that is connected to a primary controller area network (CAN) bus 32, a secondary CAN bus 34, and a universal serial bus (USB) 36. The primary CAN bus 32 can carry high-priority messages, such as motor commands and bump sensor messages, and the secondary CAN bus 34 can be used for lower priority sensor information, such as the sensor array and other possible sensors. This separation ensures that the high priority bus is never bogged down by messages flooding the secondary CAN bus 34, which can happen if the sensor array is overly active.

Connected to the primary CAN bus 32 are one or more bump sensors 38 that can be used to sense when the robot is bumped, for example, by a user. Also connected to the primary CAN bus 32 are multiple motor controllers 30 (Controllers A, B, and C) that can be used to control motors of the holonomic drive system 20 (FIG. 2). In some embodiments, each of the omni-wheels 22 of the drive system 20 are driven by a brushed direct current (DC) motor having a 64 count per revolution, magnetic, quadrature encoder on the motor shaft and an output gearing of 29:1. This enables very fine-grained control of speed and positioning. In some embodiments, each motor controller 30 can comprise a custom circuit board containing a dsPIC33FJ128MC804 microcontroller and a motor driver chip. The microcontroller can communicate with the mainboard 30 through the primary CAN bus and monitor information, such as odometry, wheel speed, and fault conditions. Odometry from each wheel 22 can be polled periodically by the mainboard 30 to calculate the total distance and direction traveled by the robot 10.

As described above in relation to FIGS. 1 and 2, the outer housing 12 of the robot comprises a plurality of touch sensors 14, which can comprise trackball sensors, and lights 16 associated with the sensors, which can comprise LEDs. In some embodiments, the outer housing 12 of the robot 10 supports an array of 67 circuit boards (identified by reference numeral (26 in FIG. 2)) each containing a PIC16LF1827 microcontroller, multiple LEDs, and a miniature trackball (Sparkfun.com COM-09308), which is accessible from the outside of the housing. When a user runs his or her hand along the housing, he or she swipes the trackballs, which have independent magnetic encoders for each direction: up, down, left, and right. A Hall effect sensor can be associated with each trackball to output a square wave signal that has a frequency proportional to the velocity of the trackball in that direction. In some cases, a single rotation of a trackball in one direction causes approximately 20 signal level transitions. Each trackball is monitored by its respective microcontroller for any movement; movement being defined as any transition (high-to-low or low-to-high)

of the Hall effect signal. Transitions are grouped into 1 ms bins and any bin that contains one or more transitions is treated as a single spike.

With reference back to the embodiment of FIG. 3, connected to the secondary CAN bus 34 is a trackball array controller 42 that controls the trackballs of the robot 10. As shown in the figure, the trackball array controller 42 comprises first and second channels 44 and 46, which can comprise serial peripheral interface (SPI) busses, each having its own chip selector 48, 50 to which are coupled multiple trackball rows 52. In this example, there are a total of nine trackball rows 52 in which groups of trackball boards are joined and can be daisy chained by one of the channels 44, 46. In some embodiments, each trackball board microcontroller functions as a SPI master device and polls the trackball boards for movement data every 8 ms. The trackball array controller 42 communicates with up to five rows on each channel 44, 46 using the chip selector 48, 50 to select a row 52. This enables the controller 42 to scan all the rows 52 every 8 ms.

The daisy chain topology described above enables the trackball array controller 42 to poll all of the trackball boards 26 (FIG. 2) in a selected row 52 by shifting 32 bits per board of command data out to each board while concurrently receiving 32 bits of transitions, or spikes, from each trackball. The received data represents the past 8 ms worth of spikes for each of the four directions. Spike data can then be forwarded to the mainboard 30 via the secondary CAN bus 34 and then to a primary controller 54, where it can be converted into SNN inputs. To lower the communication bandwidth, the array controller 42 can be programmed to only send a message if a trackball reported a spike within the last 8 ms window. In some embodiments, each trackball has a red, green, and blue LED associated with it. In order to control the LED colors and patterns, commands can be sent to the array controller 42 through the mainboard 30 to individually control each LED or multiple LEDs. This command data is shifted out to each row 52 while the spike data is being collected.

The primary controller 54 comprises a processor that acts as the "brain" of the robot 10. By way of example, the controller 54 can comprise a Wandboard™ (www.wandboard.org) having an i.MX6 quad core ARM Cortex A9 processor. One benefit of such a processor is its low power usage. Even at full load, the ARM processor only consumes a few watts of power. This enables complex control software and neural models to be run from battery power (provided on the robot 10), making the robot completely autonomous. In some embodiments, the controller 54 runs SNN algorithms that control the robot's behavior.

Connected to the main controller 54 are a microphone 56 and speakers 58, which provide further means of communicating with a user. As is also illustrated in FIG. 3, the main controller 54 is connected to a camera 60. In some embodiments, this connection can be via an Ethernet connection 62.

With further reference to FIG. 3, the robot 10 can include one or more wireless communication components 62, such as wireless transceivers, that enable the robot to wirelessly communicate with other devices. In some embodiments, the wireless communication components 62 can be integrated onto the mainboard 30 and communicate using standard radio frequency (RF) protocols, such as WiFi and/or Bluetooth. Notably, in cases in which an SNN is too large to run locally on the robot 10, the wireless connectivity enables an SNN on a remote computer to control the hardware.

In some embodiments, Atmel SAM3X microcontrollers (identified as controllers 40 in FIG. 3) handle low-level control tasks, such as translating the motor commands into the complex vectors needed to control the holonomic drive system 20 (FIG. 2), responding to reflexive inputs like bump sensors 38, and routing data between the main controller 54 and the two CAN busses 32, 34.

Figure 4:
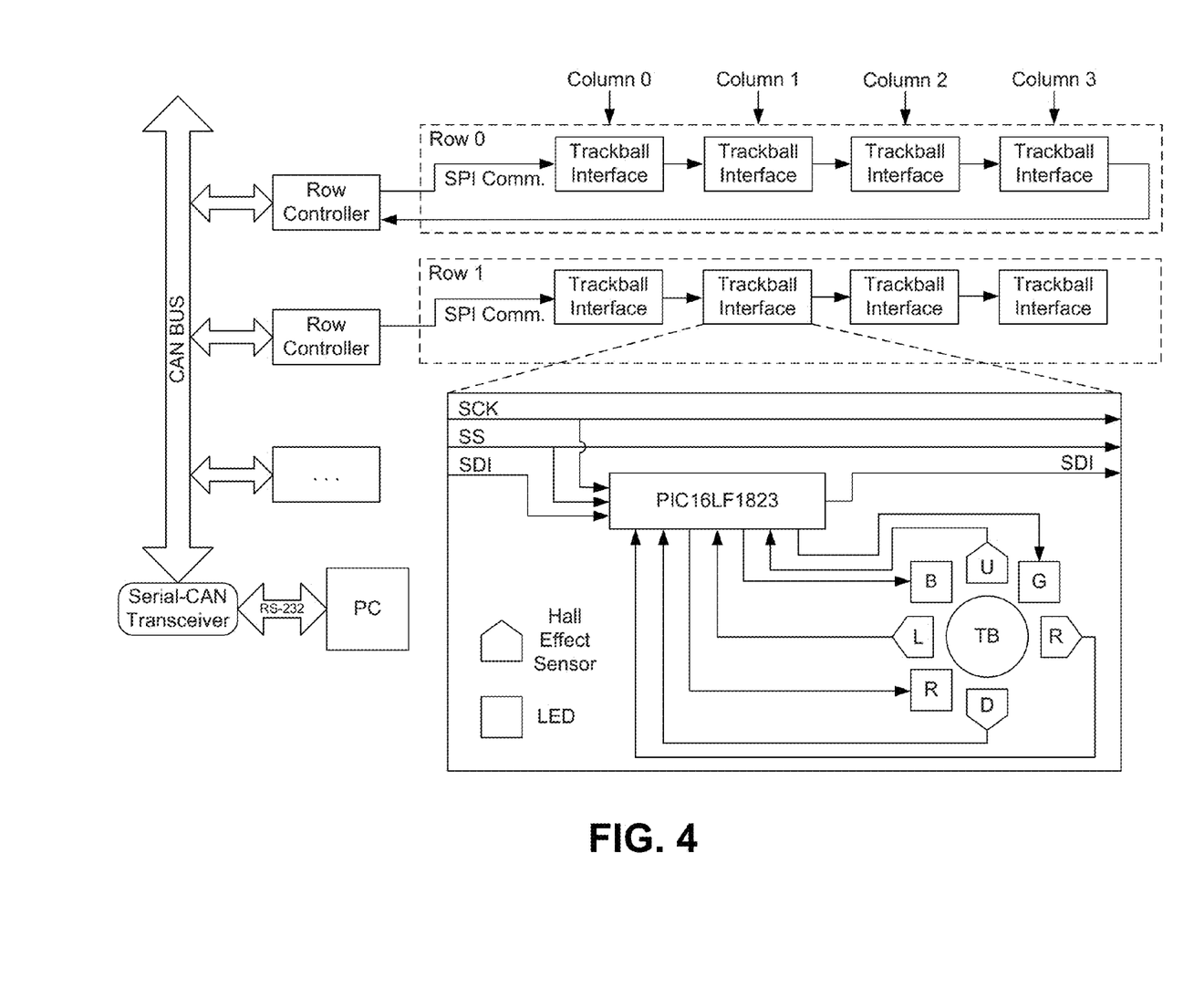
FIG. 4 is a block diagram of an embodiment of an architecture of a trackball array of the robot of FIG. 3.

A prototype of a trackball array was constructed using off-the-shelf boards from Sparkfun.com (COM-09320) for the purpose of performing SNN experiments and to test the usefulness and accuracy of the trackball system. FIG. 4 shows the architecture of the array. As indicated in this figure, a 4×4 array of trackballs was built with a PIC16F1824, microcontroller monitoring each trackball board. Each row was controlled by a dsPIC33FJ128MC802 microcontroller. The row controllers were connected via a single CAN bus. Messages on the bus were converted to serial (RS-232) format and transmitted to a personal computer (PC) running an SNN simulation. When the PC received a message, it translated the information into spike events that were input to the SNN simulation.

Figure 5:
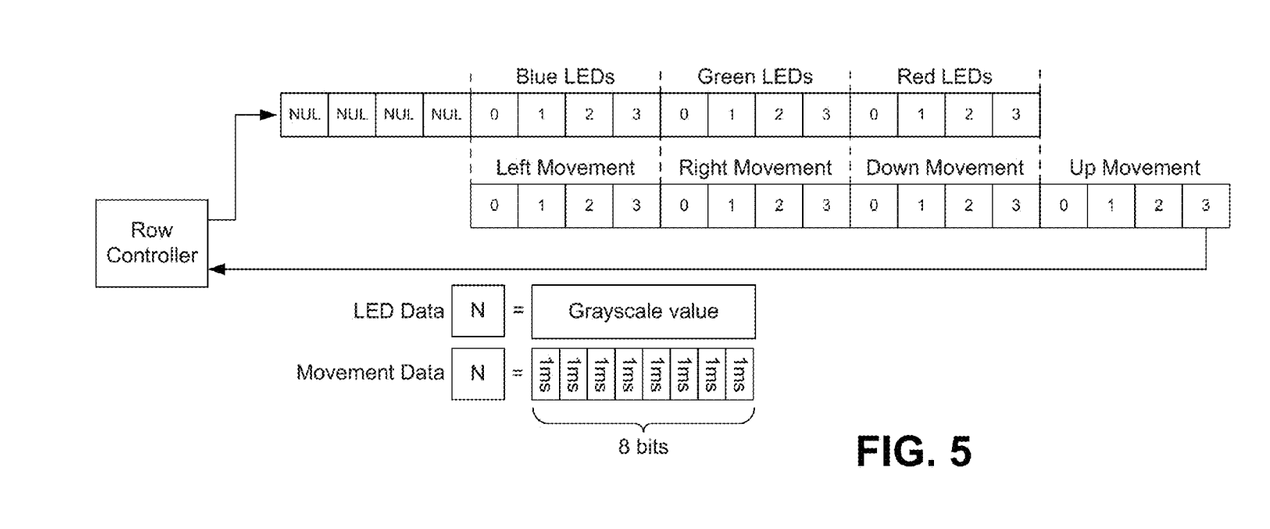
FIG. 5 is a flow diagram of data in a row of trackball boards.

Spike data was collected in the same manner as that described above by shifting 8 ms of spike data for each direction out of each trackball in a row (see FIG. 5). This means that a row with four trackballs must shift 128 bits to receive the 32 bits of spike data per trackball. Because each PIC16F1824 has an 8 bit wide shift register, each row acts as a 4 byte wide shift register. So, after 32 bits of control data has been shifted down the row and 32 bits of spike data has been received, each trackball controller must place the next byte of spike data into its shift register in preparation for the next 32 bit shift.

Once the spike data reaches the row controllers, it is converted into a message format suitable for the CAN bus. Each message contains spike data for a single direction on a single trackball and only for one 8 ms window. If multiple trackballs in a row reported spikes (or a single trackball reported spikes in different directions) within an 8 ms window, the row controller will send one message for each trackball (or direction). Sparsity is achieved by transmitting messages for time windows that contain a spike and omitting messages that do not contain any movement. The 8 ms windows are indexed by a 16-bit timestamp, which is taken from a row-local clock that is synchronized with the SNN simulation clock every two seconds. This ensures that out of order messages on the CAN bus can be reconstructed in the proper order once they reach the PC.

Figure 6:
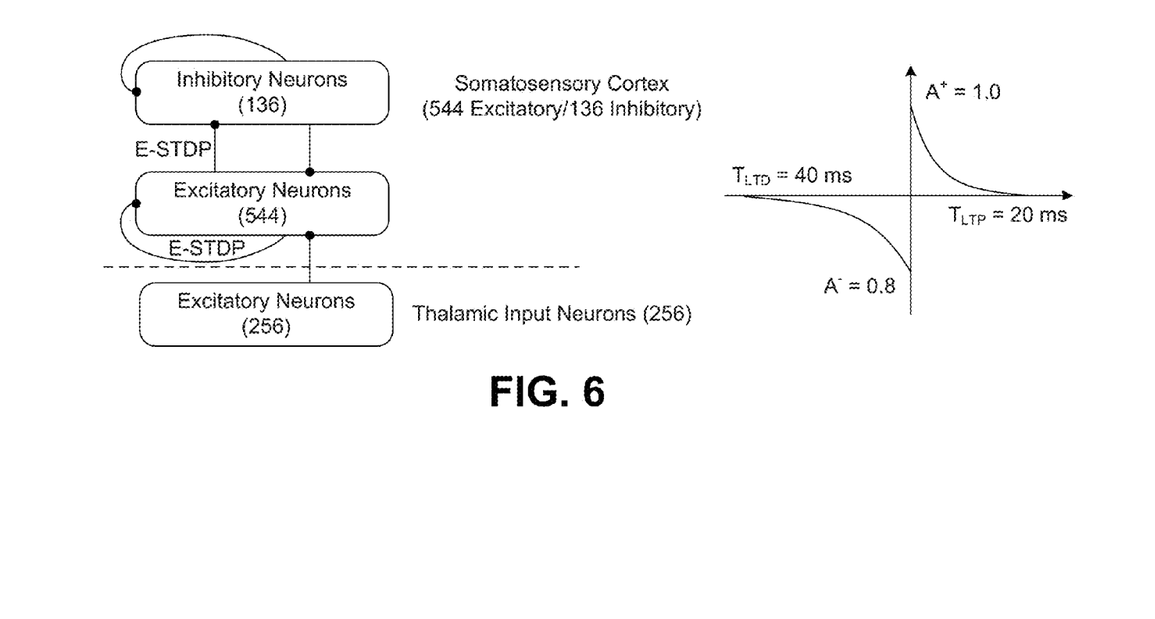
FIG. 6 is a diagram that shows an embodiment of a spiking neural network (SNN) architecture (left) and a spike timing dependent plasticity (STDP) learning rule (right).

The SNN simulation was constructed to learn hand movement patterns across the trackball array and to evaluate the ability of the network to discriminate different movements. The SNN simulation was composed of three populations of neurons, as shown in FIG. 6. A population of 544 excitatory neurons and 136 inhibitory neurons formed a spiking neural network that loosely corresponds to primary somatosensory cortex and a population of 256 excitatory input neurons that simulates thalamic neurons relaying touch information to the simulated cortex. Each neuron in the somatosensory cortex received 100 synapses, which were randomly chosen from both input neurons and other somatosensory cortex neurons. These connections had delays ranging from 1 ms to 20 ms to mimic the variation in axonal conductance velocity observed in cortex. Excitatory connections labeled by E-STDP in FIG. 6 were subject to spike timing dependent plasticity (STDP). In STDP, if a sending neuron (presynaptic) spikes shortly before the receiving neuron (postsynaptic), the connection strength between these two neurons increases (see $A^+$ in FIG. 6). As the time interval between these events increases, the amount of change decreases exponentially by $T_{LTP}$. When the order of these events is reversed, the connection strength decreases (see $A^-$ and $T_{LTD}$ in FIG. 6). STDP strengthens causal relationships between neurons and tends to weaken signals that are uncorrelated.

The current-based version of the Izhikevich neuron model was used to govern the dynamics of the spiking neurons. The dynamics of inhibitory and excitatory neurons in the Izhikevich neuron model can be described by the following equations:

$$dv/dt=0.04v^2+5v+140-u+I \quad (1)$$

$$du/dt=a(bv-u) \quad (2)$$

$$\text{if } v=30, \text{ then } v=c, u=u+d \quad (3)$$

The variable v is the membrane potential, u is the recovery variable, I is the total current injected into a post-synaptic neuron, and a, b, c, and d are parameters chosen based on the neuron type. For regular spiking, excitatory neurons, the following settings were used: a=0.02, b=0.2, c=−65.0, d=8.0. For fast-spiking, inhibitory neurons, the following settings were used: a=0.1, b=0.2, c=−65.0, d=2.0.

The synaptic current, I, into a neuron in the somatosensory cortex is described in the following equation.

$$I \times \Sigma s_j + I_{background\_noise} \quad (4)$$

The variable $s_j$ is the synaptic weight of synapse j, which had an initial value of 6.0 and could range from 0.0 to 12.0. The weights of inhibitory synapses were fixed at −4.0. The summation of all $s_j$ presents the total current contributed by all firing pre-synaptic neurons. $I_{background\_noise}$, which was set to 15.0 for one randomly selected neuron per ms, caused the somatosensory cortex to have spontaneous activity.

The synaptic current injected into an input neuron was the summation of $I_{input\_noise}$ and $I_{input}$. $I_{input}$ was set to 100 when the corresponding trackball was moving in the neuron's preferred direction; otherwise the current was set to 0. $I_{input\_noise}$, which was set to 16.5 for one randomly selected neuron per ms, caused the input area to have spontaneous activity.

$$I=I_{input\_noise}+I_{input} \quad (5)$$

The stimuli to the SNN simulation came directly from the trackball movement messages described above. Each of the 16 trackballs gave a signal for up, down, left, and right from which the direction of movement and the speed of movement could be derived. These 64 input signals were connected to 4 neurons resulting in the 256 input neurons shown in FIG. 5. Because signals from the trackball array can arrive so rapidly that the input neuron's firing rate is unnaturally high, the $I_{input}$ current was injected (see Equation 5) in a round-robin fashion to the 4 neurons that respond to the same trackball and direction.

To train the SNN, the input pattern of 100 left moves and 100 right moves across the trackballs were recorded. Each movement was a manual sweep of the hand and the duration of a move ranged from 900 ms to 1600 ms with the average movement lasting 1285.4 ms±133.6 sd. These recorded inputs were fed into the input layer of the SNN by randomly choosing an input pattern and presenting it to the SNN every 2000 ms.

During training, excitatory connections were subject to STDP. The STDP function is depicted on the right side of FIG. 6. $A^+$ and $A^-$ are 1.0 and 0.8, respectively. $T_{LTP}$ and $T_{LTD}$ were 20 ms and 40 ms respectively. The learning rate for STDP was set to 0.005. The SNN was trained for 6400 seconds. After this training period, the distribution of synaptic weights became U-shaped, where most weights were either close to zero or near the maximum value of 12.0 and the minimum point was lower than 1% of maximum point.

During testing, an additional 100 left moves and 100 right moves were presented to a trained SNN. These 200 moves were repeated five times. A decoding algorithm was developed to compare firing rate coding to temporal coding, specifically the reliability of polychronous groups.

For firing rate decoding, the firing rate of each neuron in the simulated somatosensory cortex, which excluded the input neurons, was recorded and generated firing rate distributions for left and right movement trials. If the peak of the distribution for right moves was higher than that of left moves, the neuron was referred to as a right-responsive neuron, otherwise it was considered a left-responsive neuron.

For temporal decoding, polychronous groups were identified by the following criteria: 1) the group started with an anchor neuron, that is, an input neuron spike, 2) a group member had to be connected to that anchor neuron and fire a spike within 4 ms of its axonal delay, and 3) from this set of neurons, a downstream neuron needed to receive spikes from at least two upstream neurons within 4 ms of their axonal delay. This algorithm proceeded as a breadth-first search until Criterion 3 no longer could be met. The typical size of a polychronous group in our simulations ranged from 5 to 10 neuron members. A polychronous group was considered a left-predictor if the posterior probability, P(L|pg) >0.5, and a right-predicator if P(R|pg)>0.5.

The capabilities of the neuromorphic robot were demonstrated in two ways: 1) showing its ability to "express itself" with color signaling and 2) showing how an SNN can be used to learn and categorize interactive movements. The former was evaluated using the robot's convex outer housing, and the latter was evaluated using the 4×4 prototype trackball array.

Figure 7A:
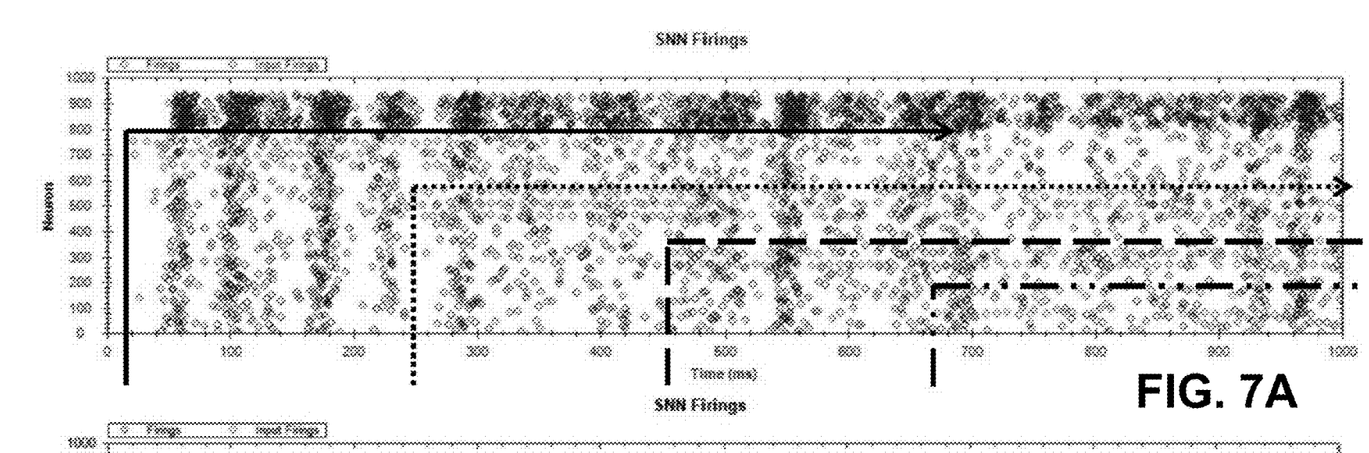
Figure 7B:
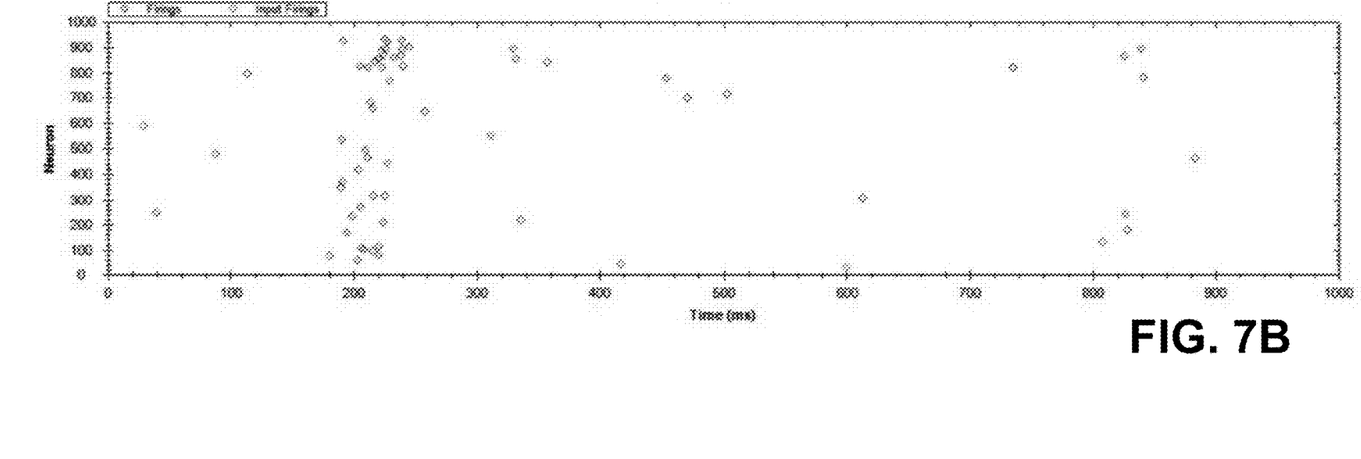

FIG. 7 shows firing activity from a representative left move (FIG. 7A) and spontaneous activity with no input (FIG. 7B). In FIG. 7A, the fourth column of the trackball array was contacted with a hand at 20 ms and then the third, second, and first columns were contacted at 240 ms, 460 ms, and 670 ms, respectively. The duration of touching a column was roughly 600 ms. The hand contacted the fourth column at 20 ms and left it at 660 ms. Two hundred left moves and 200 right moves were recorded for training and testing spiking neural networks. The interval between two message events from the trackball array in the recording ranged from 5 ms to 20 ms, which could generate firing rates from 12.5 Hz to 50 Hz. The average number of message events for a left move was 443.7 ms with a standard deviation 80.9 ms, while the average number of message events for a right move was 340.2 ms with a standard deviation 54.8 ms. FIG. 7B shows spontaneous activity of an SNN when there is no stimulus from the trackballs. The spikes are results of background noise and input noise (i.e., $I_{input\_noise}$ and $I_{background\_noise}$).

Figure 8A:
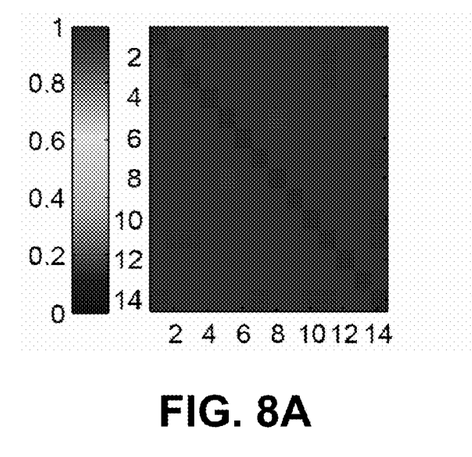
FIG. 8A shows the firing activity before training and FIG. 8B shows the firing activity after training. In the graphs, rows and columns 1-8 are left movements while rows and columns 9-16 are right movements.
Figure 8B:
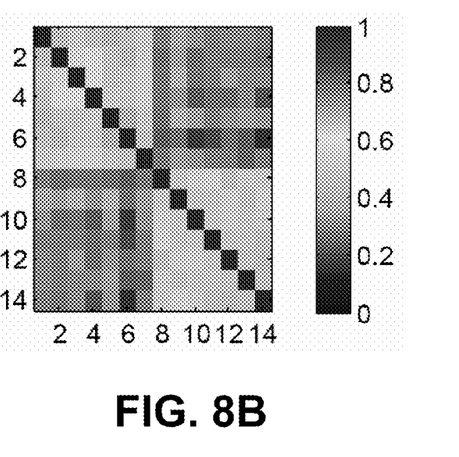

The simulated somatosensory cortex showed repeatable patterns of firing in response to left and right hand movements. FIG. 8 shows the correlation of firing activity between 8 right (rows and columns 1-8) and 8 left (rows and columns 9-16) movements before training (FIG. 8A) and after training (FIG. 8B). Note that after training through unsupervised STDP, similar classes of movements were highly correlated, whereas different classes were not.

Figure 9A:
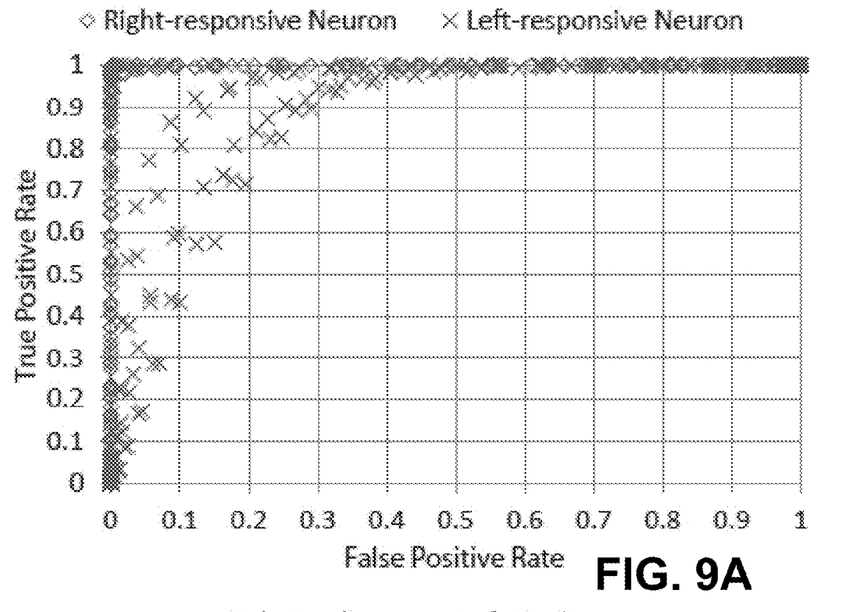
Figure 9B:
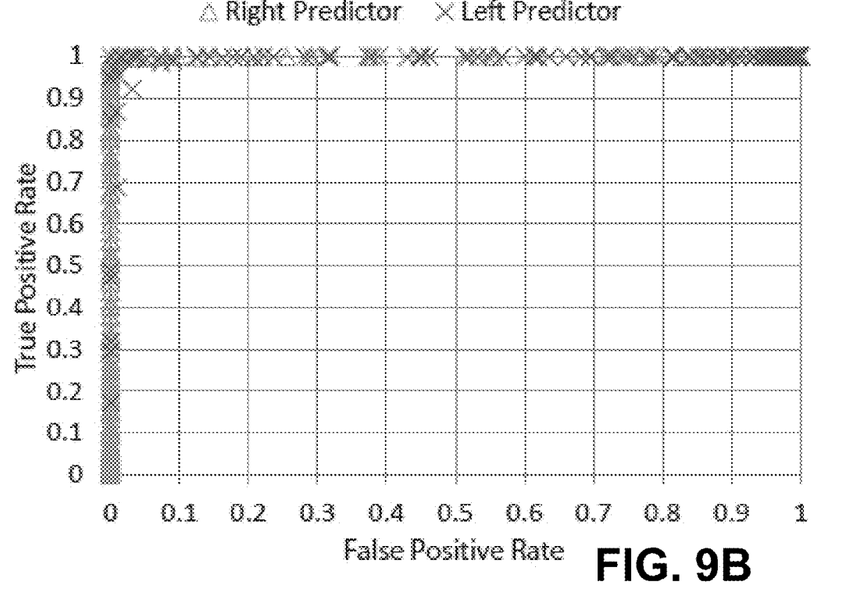

Receiver operator characteristic (ROC) curves were used to evaluate the performance of rate decoding and polychronous group decoding. FIG. 9A shows the ROC curves for rate decoding left and right movements using left and right responsive neurons and FIG. 9B shows the ROC curves for temporal decoding using left and right predicting polychronous groups. For the rate code, the firing rate threshold was varied from 0.0 Hz to 6.0 Hz by steps of 0.1 Hz. For the temporal code, the number of repeating polychronous groups threshold was varied from 0 to 100 by steps of two. Over five different simulations, the average number of polychronous groups was 382±75 sd, and the reoccurrence of a polychronous group across all trials ranged from 5% to 38% with a median value of 10%.

Both the firing rate and the polychronous group decoding were near perfect with the area under the ROC curve approaching 1 (see FIG. 9). The upper left region of the ROC curve is the desired case where there is a high true positive rate and a low false positive rate. To better understand the classification performance, the number of points that had a true positive rate above 90% and a false positive rate less than 10% were evaluated. For rate coding, only right-responsive neurons fit this criteria, where there were 38 points with thresholds ranging from 2.7 to 3.8 Hz. For polychronous groups, there were 45 points for right predictors and 11 points for left predictors that met this desirable decoding criteria. The threshold ranged from 4 to 30 groups.

The prevalence of right decoding over left may be due to differences in hardware. In general, right input neurons fired at a higher rate, which resulted in more STDP learning of neurons connected to right input neurons. A way to overcome such initial imbalances is to implement a homeostatic mechanism. Alternative versions of the neuromorphic robot can incorporate such mechanisms.

It is interesting that the temporal coding outperformed firing rate coding. This may be due in part to the polychronous groups being anchored to an input neuron, whereas firing rate decoding only considered somatosensory cortex neurons. Nevertheless, it is impressive that these tightly coupled spike orders repeated over multiple trials. The sensory input was noisy, with a high degree of variability. This suggests that both types of coding may complement each other and can be used for learning and recalling tactile patterns.

Several interactive games that can be played using a tactile, interactive neuromorphic robot were developed as part of a pilot study. One goal of the study was to determine if repeated use of the robot leads to improvement in the way subjects interact with the robot, and if they lead to improved sensorimotor control and social interaction. Similar to videogames, each game with the robot has different levels. As subjects become proficient at one level, they can be challenged with levels of increasing difficulty and complexity. Subject performance can be stored on an accompanying computer. Each subject can have a unique identifier to log his or her data.

In a first game, named "ColorMe," subjects rub the surface of the robot and the robot responds by displaying a color specific to that direction of movement. In order to get a color response, subjects must move their hand across the robot's surface smoothly and coherently. Specifically, the robot will only display a color if enough trackballs are moved in the same direction at the same speed. In easy levels, the number of movement-color patterns will be small (e.g., two) and the tolerance for responding with a color will be broad (e.g., window of acceptable speeds and number of congruent trackballs will be large). When subjects become proficient at a level, the number of movement-color patterns increases and the acceptable speed and movement pattern tolerance will narrow. Various data can be collected by an accompanying computer as the game is played. In some embodiments, these data comprise the number of successful movements per session; the game level achieved per session; the trackball telemetry including speed, direction, and movement correlation; and answers to questions for the user about the game, such as was it engaging? Was it difficult?

In a second game, named "DanceMe," a desired trajectory is displayed on the accompanying computer with a start, finish, and an icon for the robot's position. When a subject sweeps his or her hand across the robot, the robot will move in that direction. For example, a sweep from back to front will cause the robot to move forward proportional to the speed of the hand sweep. A sweep from left to right will cause the robot to turn rightward. In easy levels, the desired trajectory may be straight down a wide corridor. At more difficult levels, subjects may need to move the robot down narrower corridors with more circuitous paths. If the robot arrives at the finish line, it will perform a colorful victory dance and song. If the robot moves out of bounds, it will display said colors and make said sounds. As with the first game, various data can be collected by the accompanying computer as the game is played. In some embodiments, these data comprise the game level achieved per session; the trackball telemetry including speed, direction, and movement correlation; and answers to questions for the user about the game.

In a third game, named "FeedMe," subjects train the robot to learn a color that predicts a hand movement. In an example scenario, the robot will flash random color. A smooth movement from front to back will elicit a pleasant sound and will pair that hand movement with the color. The robot will move slightly towards the subject and the color will be dim at first. After multiple pairings, when the robot flashes the color, it will move towards the subject. Every time this behavior is reinforced with the expected hand movement, the color becomes brighter, the movement becomes faster, and the pleasant sound becomes louder. This is an example of positive reinforcement. In a variation on the game, negative reinforcement can be provided. In such a case, the robot can test the subjects' ability to learn new pairings and the robot will occasionally unlearn a pairing, forcing the subject to be flexible and retrain the robot. The game can be made more challenging by increasing the number of pairings and forcing these set shifts. Again, various data can be collected by the accompanying computer as the game is played. In some embodiments, these data comprise the learning rates; the number of pairings learned; the trackball telemetry including speed, direction, and movement correlation; and answers to questions for the user about the game.

The ColorMe game was played by 20 students from the University of California, Irvine (UCI) Child Development School using a neuromorphic robot. The students were presented with a direction and pattern of movement with which to stroke the robot. Each direction had a color associated with it and the robot's shell acted like a palette. Correct movements, which had the appropriate speed and direction, colored its shell with the desired color. If the majority of the robot's shell was colored with the desired color, the student completed that level and could move on to a higher level. As levels got higher, the speed tolerance and pattern of movements became more difficult.

The age of the students ranged from 7 to 11 years old. Eighteen students were diagnosed with ADHD, 6 students were diagnosed with ASD, 5 students were diagnosed with oppositional defiant disorder (ODD), and 5 students had an anxiety disorder. Of the 18 ADHD students, five were diagnosed with only ADHD. One student had not yet been diagnosed and was not analyzed.

Figure 10:
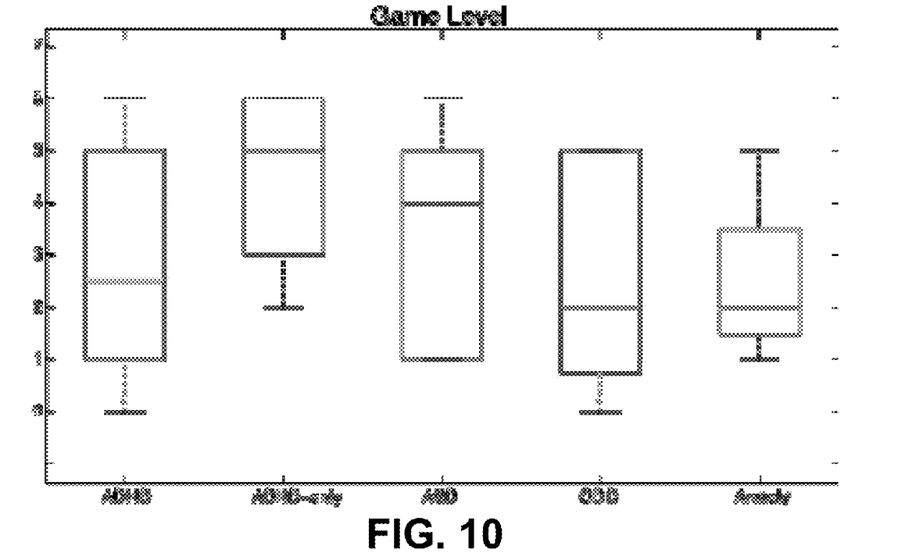
FIG. 10 is a graph that identifies the highest game level achieved by students playing a ColorMe game on a neuromorphic robot.
Figure 11A:
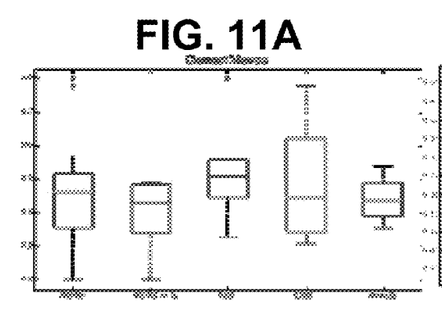
FIGS. 11A-11D are graphs that identify (A) correct moves, (B) wrong moves, (C) fast moves, and (D) slow moves made while the subjects played the ColorMe game.
Figure 11B:
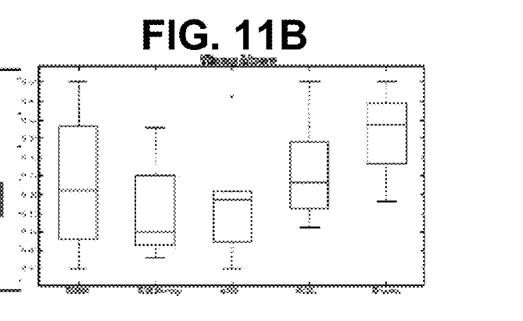
Figure 11C:
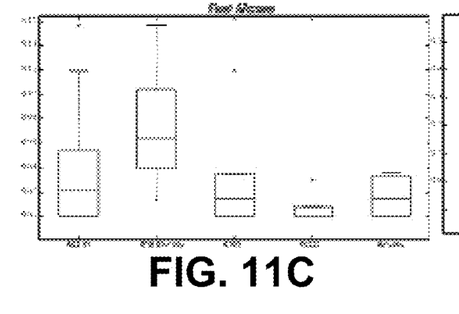
Figure 11D:
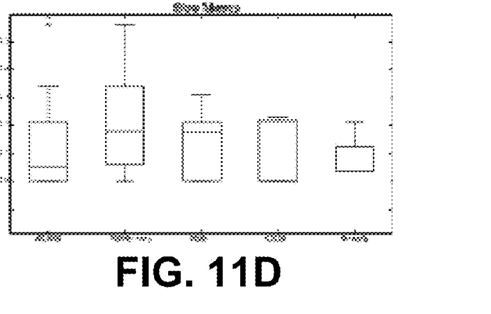

The subjects with only ADHD and with ASD completed the most game levels, as indicated in FIG. 10. Students with ODD and anxiety disorders achieved lower levels. It should be noted that the amount of time each student played the ColorMe game varied. Nevertheless, this data shows an interesting trend. Anecdotally, ADHD subjects tended to want to be more challenged and attempted more levels. However, their movements were more erratic. In contrast, ASD and ODD subjects had a more conservative approach and would repeat levels. These differences also show up in the analysis of hand movements described below.

As shown in FIG. 11, performance, as measured by the types of movements, varied depending on the diagnosis. For example, subjects with only ADHD had fewer correct moves than those subjects with ASD (FIG. 11A). Correct moves are defined as moves in the correct direction at the desired speed, which has to be constant. Wrong moves were defined as movements in the incorrect direction (FIG. 11B). Students with only ADHD had the least wrong directions, but students with ODD and anxiety disorders had more wrong moves. For a movement to be correct, it had to be within speed limits. Interestingly, despite having the least moves in the wrong direction, the ADHD only group had the most hand movements that were categorized as too fast or too slow. ASD subject tended to have more too slow movements. It should be noted that most of the speed errors were due to slow rather than fast movements.

Figure 12A:
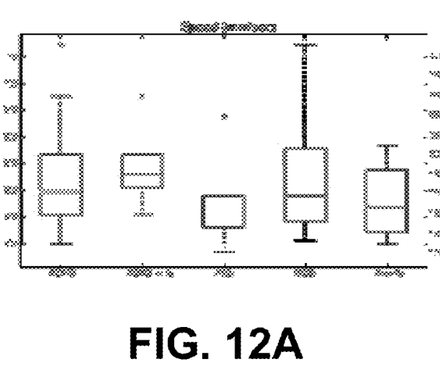
FIGS. 12A and 12B are graphs that identify (A) the speed and (B) speed variability of hand movements while the subjects played the ColorMe game.
Figure 12B:
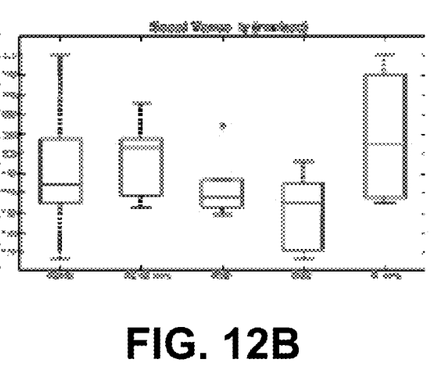
Figure 13:
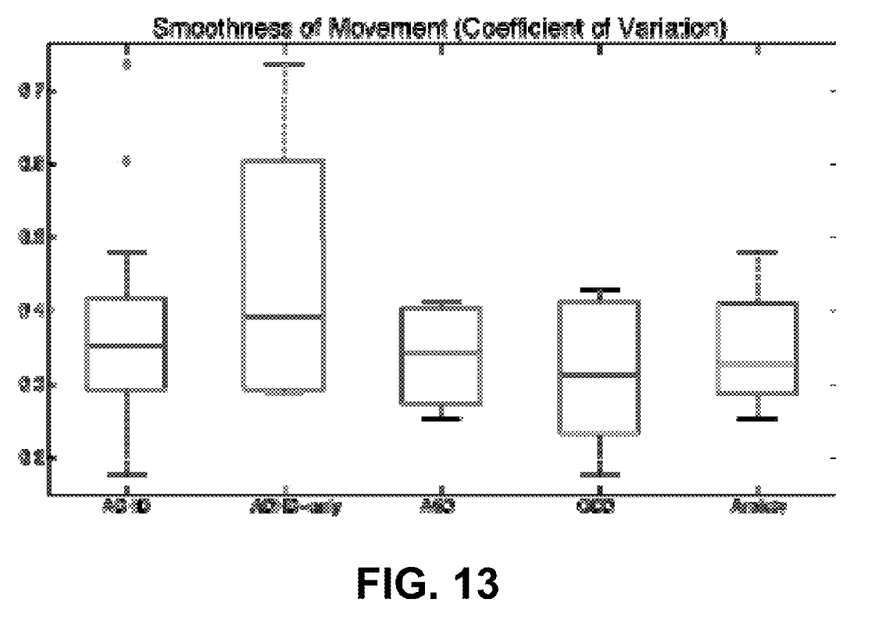
FIG. 13 is a graph that identifies the smoothness of hand trajectories while the subjects played the ColorMe game.

ADHD only subjects had higher hand movement speeds, which led to increased variability (FIG. 12A). ASD subjects, on the other hand, showed the opposite trend. Similar to ASD, ODD subjects slower movements with less variability (FIG. 12B). The subjects with anxiety disorders had the highest group variability. Speed was calculated as the average speed of a hand trajectory across the robot's trackballs and the variability was the standard deviation of that trajectory. Another way to look at these hand trajectories is to measure the smoothness of the subject's movements across the robot's shell. If one thinks of a trajectory as the hand moving from a starting point to an ending point, how much does their hand deviate from this path? This can be calculated by dividing the standard deviation of a path by the mean of the path (i.e., the coefficient of variation). The smoothness of movement shown in FIG. 13 shows that ADHD only subjects tended toward more circuitous and discontinuous trajectories when compared to other subjects.

The invention claimed is:

1. A neuromorphic robot comprising:
a curved outer housing that forms a continuous curved outer surface;
a plurality of trackball touch sensors provided on and extending across the continuous curved outer surface in an array, each trackball sensor being configured to detect a direction and velocity a touch of a user;
a plurality of lights, one light being collocated with each trackball touch sensor and being configured to illuminate when its collocated trackball touch sensor is touched by the user; and
a neural network configured to receive encoded signals from the trackball touch sensors in response to a sweeping stroke of a user's hand across the outer surface of the outer housing, the encoded signals comprising spatiotemporal information indicative of a direction and a velocity of the sweeping stroke, the neural network further being configured to interpret the sweeping stroke of the user based on the direction and velocity and to cause the robot to react with immediate feedback to the user based upon the interpretation.

2. The robot of claim 1, wherein the outer housing is convex.

3. The robot of claim 1, wherein the outer housing is hemispherical.

4. The robot of claim 1, further comprising a bump sensor configured to detect when the robot is bumped by the user.

5. The robot of claim 1, further comprising a pan and tilt camera configured to capture images of the user.

6. The robot of claim 1, further comprising a wireless communication component configured to communicate with another device.

7. The robot of claim 1, further comprising a microphone configured to capture sounds made by the user.

8. The robot of claim 1, further comprising a speaker configured to emit sounds that relate to the interpretation of the touch.

9. The robot of claim 1, further comprising a drive system configured to move the robot in a desired direction.

10. The robot of claim 9, wherein the drive system comprises a holonomic drive system including multiple omni-wheels having rollers that can be rotated to drive the robot in a direction that is perpendicular to a drive direction of the wheel.

11. The robot of claim 1, further comprising a controller that executes the neural network as a spiking neural network (SNN) and comprises one or more SNN algorithms that are configured to control the robot's behavior.

12. The robot of claim 11, wherein the trackball touch sensors are configured to provide spike data representing the user's sweeping stroke to the controller, which converts the spike data into SNN inputs.

13. The robot of claim 11, wherein the robot's behavior depends upon the nature of the user's sweeping stroke.

14. A method for interacting with a human user, the method comprising:
providing a neuromorphic robot having a continuous curved outer surface, a plurality of trackball touch sensors provided on and extending across the continuous curved outer surface in an array, and a plurality of lights, one light being collocated with each trackball touch sensor and being configured to illuminate when its collocated trackball touch sensor is touched by the user;
the robot detecting a sweeping stroke of the user's hand across the outer surface with the trackball touch sensors;
the robot encoding signals from the trackball touch sensors as neural spikes that retain spatiotemporal information and enable decoding for a direction and velocity of the sweeping stroke;
the robot interpreting the neural spikes using a spiking neural network (SNN) that is capable of learning temporal patterns and therefore discriminate user inputs; and
the robot reacting to the sweeping stroke with feedback for the user.

15. The method of claim 14, wherein the robot stores information about the user based upon the nature of the user's sweeping stroke.

16. The method of claim 14, wherein the robot reacting comprises one or more of the robot emitting a particular sound, emitting a particular color, and moving in a particular direction.

17. The method of claim 14, wherein detecting a sweeping stroke of the user's hand comprises detecting the sweeping stroke while the user is playing a game with the robot.

18. The method of claim 17, wherein the game involves emitting a correct color for the user when the sensors detect the same velocity and direction from the sweeping stroke.

19. The method of claim 17, wherein the game involves the user moving the robot in a desired direction by controlling the direction of the sweeping stroke.

20. The method of claim 17, wherein the game involves training the robot to learn a color that predicts a particular sweeping stroke.

* * * * *